(12) United States Patent
Haschke

(10) Patent No.: US 8,096,097 B2
(45) Date of Patent: Jan. 17, 2012

(54) METHOD FOR ENCLOSING PRODUCTS IN A PACKAGE HAVING A HANDLE

(75) Inventor: Eggo Haschke, Deerfield, IL (US)

(73) Assignee: Precitec Corporation, Mundelein, IL (US)

( * ) Notice: Subject to any disclaimer, the term of this patent is extended or adjusted under 35 U.S.C. 154(b) by 127 days.

(21) Appl. No.: 12/604,698

(22) Filed: Oct. 23, 2009

(65) Prior Publication Data

US 2011/0094185 A1    Apr. 28, 2011

(51) Int. Cl.
*B65B 61/14* (2006.01)
*B65B 51/04* (2006.01)

(52) U.S. Cl. .......... 53/413; 53/417; 53/134.1; 53/138.4; 426/410; 426/129

(58) Field of Classification Search .................... 53/413, 53/417, 134.1, 138.4, 567, 576; 426/410, 426/415, 129
See application file for complete search history.

(56) References Cited

U.S. PATENT DOCUMENTS

| | | | | |
|---|---|---|---|---|
| 3,945,171 A * | 3/1976 | Marietta et al. | ..................... | 53/79 |
| 4,044,450 A * | 8/1977 | Raudys et al. | ................... | 29/509 |
| 4,247,005 A * | 1/1981 | Buxton | ......................... | 206/525 |
| 4,352,263 A * | 10/1982 | Andrews, Jr. | ................... | 53/436 |
| 4,537,006 A * | 8/1985 | Pieri | ............................ | 53/134.1 |
| 5,476,673 A * | 12/1995 | Sombrio | ........................ | 426/410 |
| 5,755,022 A * | 5/1998 | Whittlesey | ...................... | 29/788 |
| 5,773,059 A * | 6/1998 | Delius et al. | ................... | 426/129 |
| 6,524,178 B1 * | 2/2003 | Fassler et al. | ................... | 452/37 |
| 6,883,297 B2 * | 4/2005 | Kirk et al. | ........................ | 53/502 |
| 7,143,566 B2 * | 12/2006 | May et al. | ..................... | 53/138.4 |

* cited by examiner

*Primary Examiner* — Paul Durand
(74) *Attorney, Agent, or Firm* — Clark Hill PLC

(57) ABSTRACT

An apparatus for encasing product in a tubular material with a handle is described. The apparatus of the preferred embodiment of the invention comprises a delivery conveyor, a ram located on a first side of the delivery conveyor, a product horn located at a side of the delivery conveyor opposite the ram, the product horn having a first end and a second end, the first end adjacent the delivery conveyor and the second end remote from the delivery conveyor, a sealer configured to form tubular seamed casing about the product horn, a printer in data communication with a scale, a clipper located at the second end of the product horn, and a plurality of tag handles feeding through the printer and to the clipper.

7 Claims, 5 Drawing Sheets

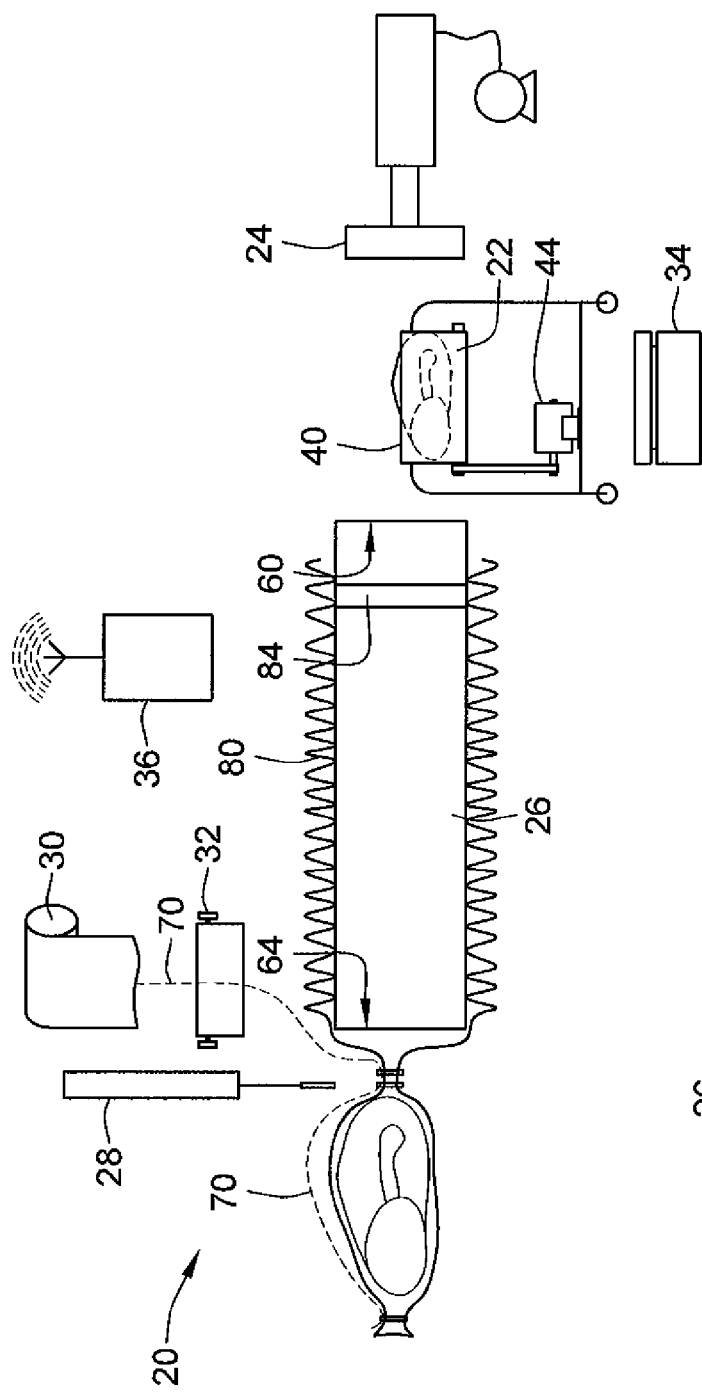
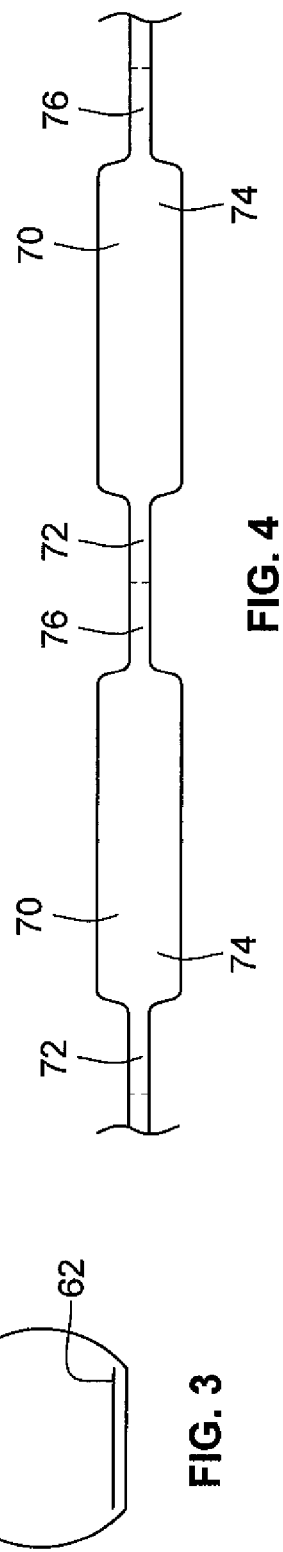
FIG. 2
FIG. 3
FIG. 4

METHOD FOR ENCLOSING PRODUCTS IN A PACKAGE HAVING A HANDLE

BACKGROUND OF THE INVENTION

This invention is generally directed to a system for enclosing products, such as poultry, hams, or other materials, in package having a handle. The invention will be described for use in packaging whole dressed poultry, but the invention can be used cut-up poultry parts or for other materials, food or otherwise.

The poultry industry sells chickens either as whole dressed birds or as cut-up parts. A consumer can buy a whole dressed chicken, can buy one dressed chicken cut up into parts, or can buy a package of, for example, just legs or just wings. In the two latter situations, the chicken parts are conventionally placed in a disposable tray, typically polystyrene foam, in order to hold the parts together. Some poultry producers place whole dressed birds on these trays also.

Prior-art methods of packaging poultry include wrapping the poultry in a clear plastic material and placing the poultry in a plastic bag. Some methods include shrinking the material or bag using heat. Other methods included using stretchable bags with memory agent. In any case, the consumer normally must handle the package at the market. Some consumers dislike handling packages of uncooked poultry. Accordingly, there is a need for an apparatus to enclose uncooked poultry in a package with a handle that allows the consumer to lift the package without touching the parts of the packaging that touch the contents.

Consumers prefer tightly-wrapped packaging. Producers and sellers prefer packaging that displays the producer's or seller's trademark. Sellers prefer packaging that displays information about the contents, including by way of example and not limitation, weight, price per unit weight, total price, and expiration date for sale.

The present invention meets some or all of these requirements.

BRIEF SUMMARY OF THE INVENTION

The method of the preferred embodiment of the invention comprises the steps of providing a product having first and second ends; using a scale to weigh the product; moving the product from a first position to a second position via a delivery conveyor; using a ram located on a first side of the delivery conveyor to push the product off of the delivery conveyor and into a product horn located at a side of the delivery conveyor opposite the ram, the product horn having a first end and a second end, the first end of the product horn being adjacent to the delivery conveyor and the second end of the product horn being remote from the delivery conveyor; providing a tubular material having first and second ends and a length measured between the ends, the tubular material is open at a first end and is open at the second end; inserting the product into the tubular material such that the first end of the product is proximate to the open first end of the tubular material and the second end of the product is proximate to the second open end of the tubular material; feeding a tag handle through a printer which is in data communication with a the scale, the printer printing information on the tag handle, the tag handle having first and second ends and a length measured between the ends which is greater than the length of the tubular material; using a clipper located at the second end of the product horn to place a first clip on the tubular material and the handle to close the first end of the tubular material and attach the first end of the handle to the first end of the tubular material; and using the clipper to place a second clip on the tubular material and the handle to close the second end of the tubular material and attach the first end of the handle to the first end of the tubular material, the handle being of such a length such that a hand can be placed between the first and second ends of the handle and the tubular material when the product is encased in the tubular material.

The article of manufacture of another embodiment of the invention comprises a tubular material having a first end and a second end, and a length measured between the first end and the second end; a handle having a first end and a second end, and a length measured between the first end and the second end which is greater than the length of the tubular material; a product having a first end and a second end, the product being enclosed in the tubular material such that the first end of the product is proximate to the first end of the tubular material and such that the second end of the product is proximate to the second end of the tubular material; a first clip closing the first end of the tubular material and attaching a the first end of the handle to the first end of the tubular material; and a second clip closing the a second end of the tubular material and attaching the second end of the handle to the second end of the tubular material, wherein a hand of a user carrying the article can be placed between the first and second ends of the handle and the tubular material when the product is encased in the tubular material.

BRIEF DESCRIPTION OF THE SEVERAL VIEWS OF THE DRAWINGS

The organization and manner of the structure and operation of the invention, together with further objects and advantages thereof, may best be understood by reference to the following description of the preferred embodiments, taken in connection with the accompanying non-scale drawings:

FIG. 2 is a diagrammatic elevation view of the apparatus of FIG. 1.

FIG. 3 is a front view of the product horn of the apparatus of FIG. 1.

FIG. 4 is a diagrammatic view of two tag handles as used in the apparatus of FIG. 1.

DETAILED DESCRIPTION OF THE ILLUSTRATED EMBODIMENTS

Figure 1:
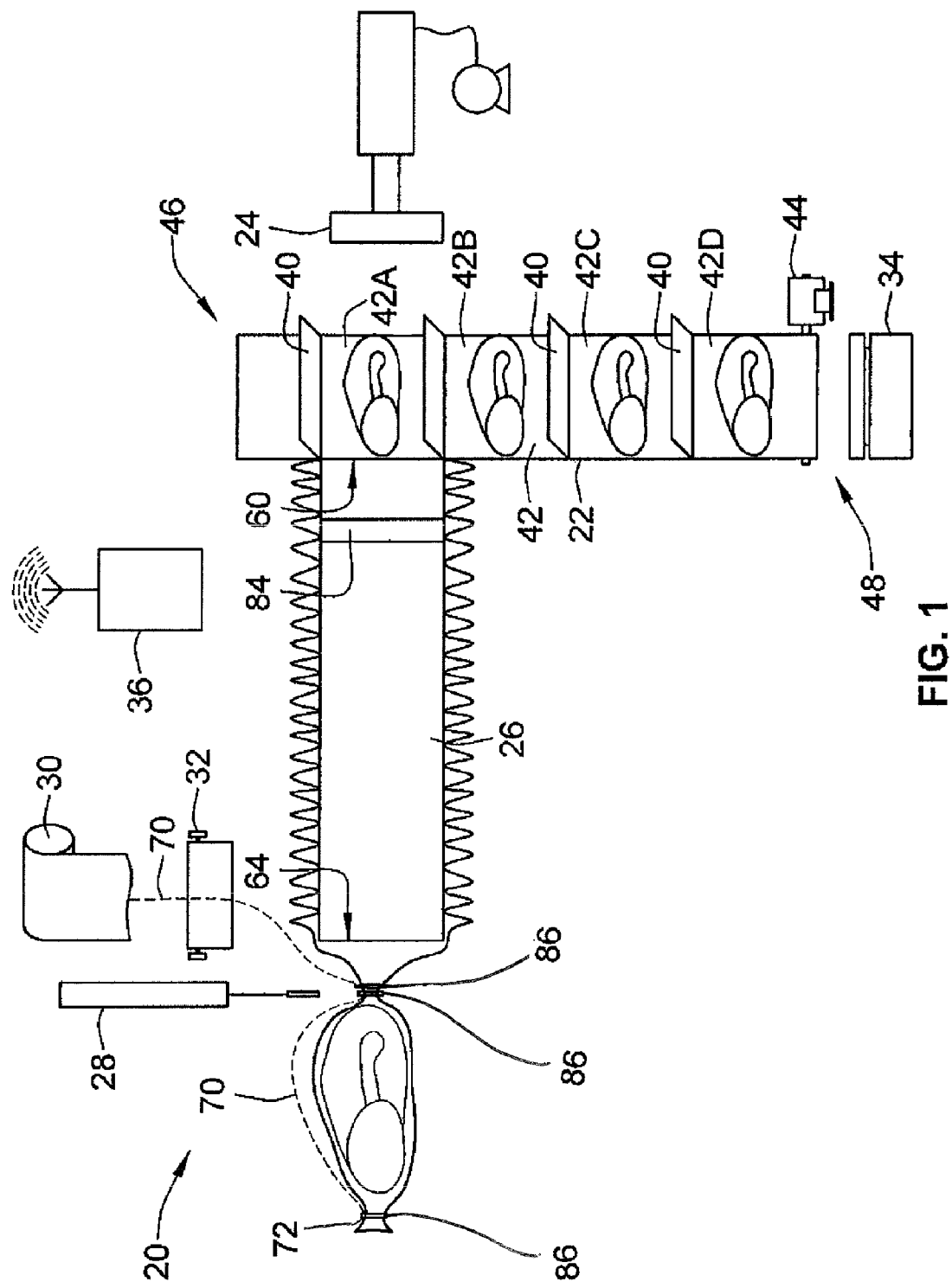
FIG. 1 is a diagrammatic plan view of the apparatus of the preferred embodiment of the present invention.

While the invention may be susceptible to embodiments in different forms, there is shown in the drawings, and herein will be described in detail, a specific embodiment with the understanding that the present disclosure is to be considered an exemplification of the principles of the invention, and is not intended to limit the invention to that as illustrated and described herein. For example, the present disclosure describes the method and apparatus as used to encase whole dressed chickens. The same method and apparatus can be used for other whole poultry, for poultry parts, such as turkey breast or cut-up parts, or for any other material that one may wish to enclose in packaging material, such as hams, sausages, cheeses, or other food or non-food products, without departure from the invention.

The apparatus 20 of the preferred embodiment of the present invention is shown in diagrammatic format in plan view in FIG. 1 and in elevation view in FIG. 2. The apparatus 20 has a delivery conveyor 22, a ram 24, a product horn 26, a clipper 28, a tag reel 30, a printer 32, a scale 34, and controller 36.

Delivery conveyor 22 is preferably a belt conveyor, with dividers 40 separating a plurality of compartments 42, and a motor 44 driving the belt. As illustrated in FIG. 1, four compartments 42A, 42B, 42C, and 42D are shown on top of delivery conveyor 24. In another embodiment, delivery conveyor 22 is a chute conveyor, a roller conveyor, a roller table, or a trolley conveyor. In yet other embodiments, delivery conveyor 22 is a cart or a table. Delivery conveyor 22 terminates at its downstream end 46 at a location approximately between ram 24 and product horn 26.

In the preferred embodiment, scale 34 is integral with delivery conveyor 22 and located between ram 24 and product horn 26. In another embodiment, scale 34 is separate from delivery conveyor 22 and located adjacent to an upstream end 48 of delivery conveyor 22. Scale 34 is in data communication with controller 36, either wirelessly or through a cable, and relays weight information to controller 36.

Ram 24 is preferably located adjacent downstream end 46 of delivery conveyor 22. Ram 24 is preferably an air-actuated cylinder having a forward and reverse stroke. Ram 24 operates off a plant compressed air system or an application-specific compressed air system. In other embodiments, ram 24 operates electromechanically, mechanically, or manually. For applications in which apparatus 20 is used to enclose poultry such as chickens, ram 24 preferably has a hocking pusher, as described in U.S. Pat. No. 7,178,310 to Veselovsky, Poly-Stretch Bagger System with Hocking Pusher, the disclosure of which is incorporated herein.

Product horn 26 is a tube having a first end 60 located adjacent downstream end 46 of delivery conveyor 22, on a side of delivery conveyor 22 opposite to ram 24. Product horn 26 in the preferred embodiment has, in cross section, a flat bottom and a circular sides and top, as shown in FIG. 3. Preferably, product horn 26 has a roller tray 62 inside it on the flat bottom, to ease movement of product through the product horn 26. In other embodiments, product horn 26 has a roller belt or other conveyor inside it for this purpose. In yet other embodiments, product horn 26 is empty.

Located adjacent second end 64 of product horn 26 is clipper 28. Clipper 28 is a standard two-punch clipper, such as an FCA3463 Automatic Double Clipper made by Poly-clip System. Clipper 28 is configured to squeeze a neck of a tube, apply a pair of clips 86 to the neck, and sever the neck between the clips. In another embodiment, clipper 28 is a manual two-punch clipper.

Tag reel 30 is located adjacent clipper 28 and is preferably mounted to clipper 28. Tag reel 30 holds a plurality of tag handles 70 as continuous strip, which are illustrated in FIG. 3. Each tag handle 70 has a first end 72, a body part 74, and a second end 76, with each first end 72 contiguous to second end 76 of an adjoining tag handle 70. A length is defined between the first end 72 and the second end 76 of each tag handle. Both first end 72 and second end 76 are configured to fit within the clips 86 being used by clipper 28. There may be perforations 78 separating each first end 72 from each adjacent second end 76. Tag handles 70 are preferably made of plastic or of fiber-reinforced paper products, sufficient to hold the weight of the product being enclosed. The continuous strip of tag handles 70 rolls out of tag reel 30 and feeds through printer 32 and into the jaws of clipper 28.

Printer 32 is preferably an ink-jet printer. Printer 32 is preferably in data communication with controller 36, which receives information from scale 34, either wirelessly or through a dedicated cable. In other embodiments, printer 32 is in data communication directly with scale 134. Printer 32 receives variable information from controller 36, such as weight of a particular dressed bird, price per pound, total price, and packaging date, and prints that data on tag handle 70. Controller 36 can also direct printer 32 to print nonvariable information such as a producer's trademark on tag handles 70, or printer 132 can be programmed to do so itself. In another embodiment, nonvariable information such as trademarks, including logos and trade dress color schemes, are pre-printed on tag handles 70.

In one embodiment, product horn 26 is securely mounted adjacent delivery conveyor 22. In another embodiment, product horn 26 is removably mounted adjacent delivery conveyor 22. A user can, in this embodiment, keep a spare product horn (not shown) available. Spare product horn can have a different size, or can be the same size and used solely to facilitate changing casings.

In some embodiments, a netting tube (not shown) is removably mounted over product horn 26. A cylinder of netting is rucked onto netting tube, preferably by the method described in U.S. Pat. No. 7,051,415 to Pinto et al., Net Rucking Apparatus and Method, or by the method described in United States Published Patent Application No. 2008/0248735 A1 by Haschke et al. Net Rucking Apparatus and Method, the disclosures of both of which are incorporated herein by reference.

In yet another embodiment, product horn 26 is mounted so that it pivots about a swivel joint 84 near delivery conveyor 22, so that downstream end 46 moves from a first position adjacent to clipper 28, to a second position remote from clipper 28. The first position is for operation of apparatus 20 to encase products. In the second position of product horn 26, a tubular casing 80 is more easily shirred onto product horn 26.

In operation, tubular casing 80 comprises fiber-reinforced regenerated cellulose, animal intestine, cellulose hydrate, or plastic material, shirred onto product horn 26. Tubular casing 80 is preferably seamless. In other embodiments, tubular casing 80 is seamed but formed into a tube at a location remote from apparatus 20. In one embodiment, tubular casing 80 is white on one side and clear on the other. In some embodiments, marketing information, such as logos and other trademarks, is pre-printed on tubular casing 80. In other embodiments, marketing information is printed on tubular casing 80 by printer 32.

In one embodiment, tubular casing 80 is made of a plastic film such as polyethylene to which a memory agent has been added. The use of polyethylene film with three to ten percent ethylene vinyl acetate (EVA) has been found to provide good memory and little distortion of printed matter. In another embodiment, tubular casing 80 is made of plastic film without memory agent. In other embodiments, other plastics and other memory agents are used.

In use, apparatus 20 is placed adjacent a chicken-dressing facility. Chickens are slaughtered, plucked, and dressed and placed in a compartment 42 at the upstream end of delivery conveyor 22. Delivery conveyor 22 eventually delivers a particular whole dressed bird to a position between ram 24 and product horn 26. In the preferred embodiment, the whole dressed bird is weighed on scale 34 and the weight is transmitted to printer 32. In other embodiments, the whole dressed bird is weighed elsewhere, as described above.

Controller 36 then causes ram 24 to actuate. At this point in the process, tubular casing 80, which has been previously shirred onto product horn 26, is closed at second end 64 of product horn 26 by a single clip 86. Single clip 86 also holds a first end 72 of the next tag handle 70 of the strip of tag handles 70, with body 74 still within printer 32. As ram 24 actuates on a forward stroke, it pushes the whole dressed bird through product horn 26 and up against the closed end of tube 26. The bird contacts the closed end of tubular casing 80 and is pushed through product horn 26, taking more tubular casing 80 from product horn 26. As the bird pushes portions of tubular casing 80 off product horn 26, tag handle 70 is also pulled out of printer 32. As tag handle 70 is pulled out, printer 32 prints information, at least variable information and, if desired, non-variable information, on tag handle 70.

When the bird is completely through product horn 26, ram 24 retracts on a reverse stroke. The jaws of clipper 28 then gather tubular casing 80 into a neck, between the bird and product horn 26. Clipper 28 then applies two clips 86 to the neck in a conventional manner, except that tag handle 70 is clipped to the neck as well. Second end 76 of tag handle 70 and first end 72 of the next tag handle 70 in tag reel 30 are attached to the gathered neck of tubular casing 80. Clipper 28 then severs the neck of tubular casing 80 between the two clips 86 in a conventional manner, which also separates second end 76 of tag handle 70 from first end 72 of the next tag handle 70 in tag reel 30. Each severed tubular casing 80 has a first end and a second opposite end. A length is defined between the first end of the tubular casing 80 and the second end of each tubular casing 80. The downstream clip 86 closes the now-encased bird in a portion of tubular casing 80. The upstream clip 86 holds tubular casing 80 closed over product horn 26, will become the downstream clip 86 of the next bird to be encased, and also holds first end 72 of the next tag handle to tubular casing 80.

The bird that was just encased is now sealed inside a segment of tubular casing 80 by a clip 86 at each end of the segment. In the embodiment in which stretchable plastic was used for the material of tubular casing 80, that plastic, which had been stretched over product horn 26, releases to its unstretched form and wraps tightly around the bird inside, giving a tight look that is pleasing to consumers.

Figure 8:
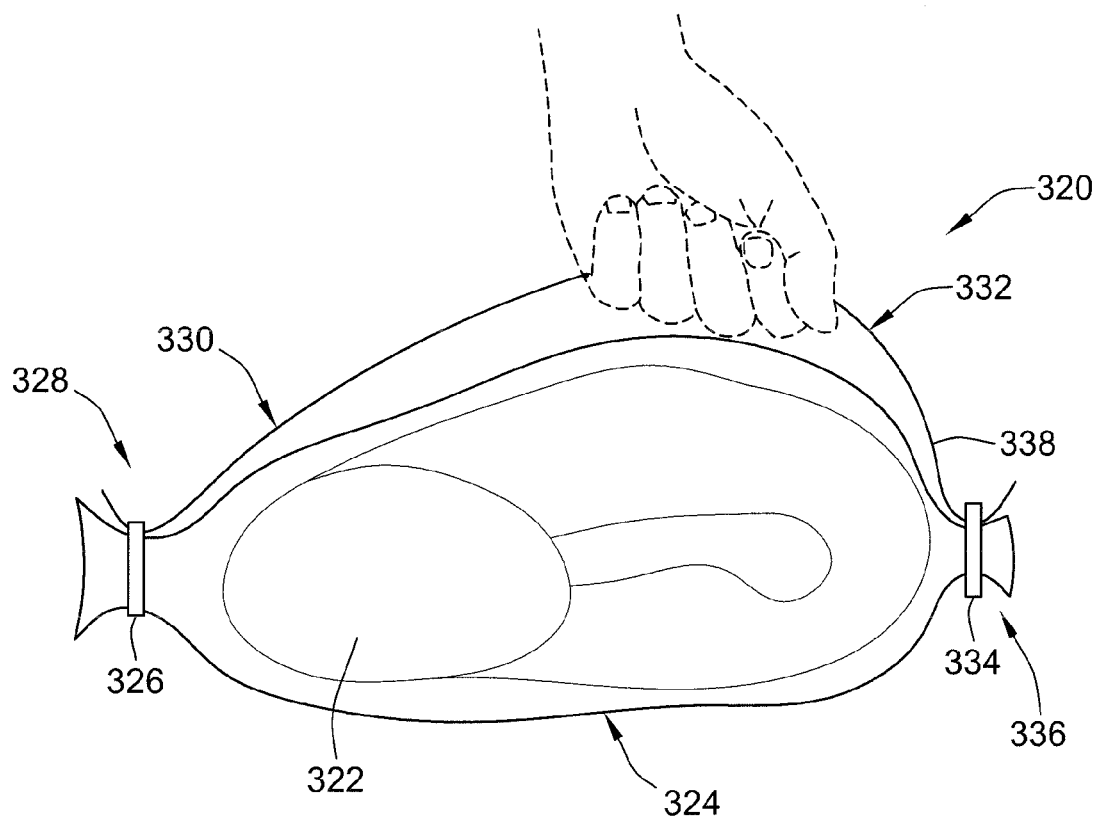
FIG. 8 is a side view of the article of FIG. 7.

Tag handle 70 is now attached to the package holding the bird, with first end 72 clipped to the first end of the closed tubular casing 80 and second end 76 clipped to the second end of the closed tubular casing 80. Tag handle 70 has a length which is greater than the length of the tubular casing 80 such that a space is provided between the tubular casing 80 and the tag handle 70 when the bird is encased in the tubular casing 80. Tag handle 70 can be grasped by a consumer to lift the package without having to touch the encased bird as the consumer can insert his/her hand into the space between the tag handle 70 and the tubular casing 80 as shown in FIG. 8. The remainder of tubular casing 80 remains shirred onto product horn 26, with the downstream end of tubular casing 80 clipped and holding a first end 72 of a tag handle 70 and waiting for the next bird to be pushed through product horn 26, to repeat the process.

In some embodiments, in which netting tube is mounted over product horn 26, the final package encases the bird in both tubular casing 80 and netting, with the clips 86 sealing both the tubular casing 80 and the netting at each end and holding a tag handle 70 in between.

Figure 5:
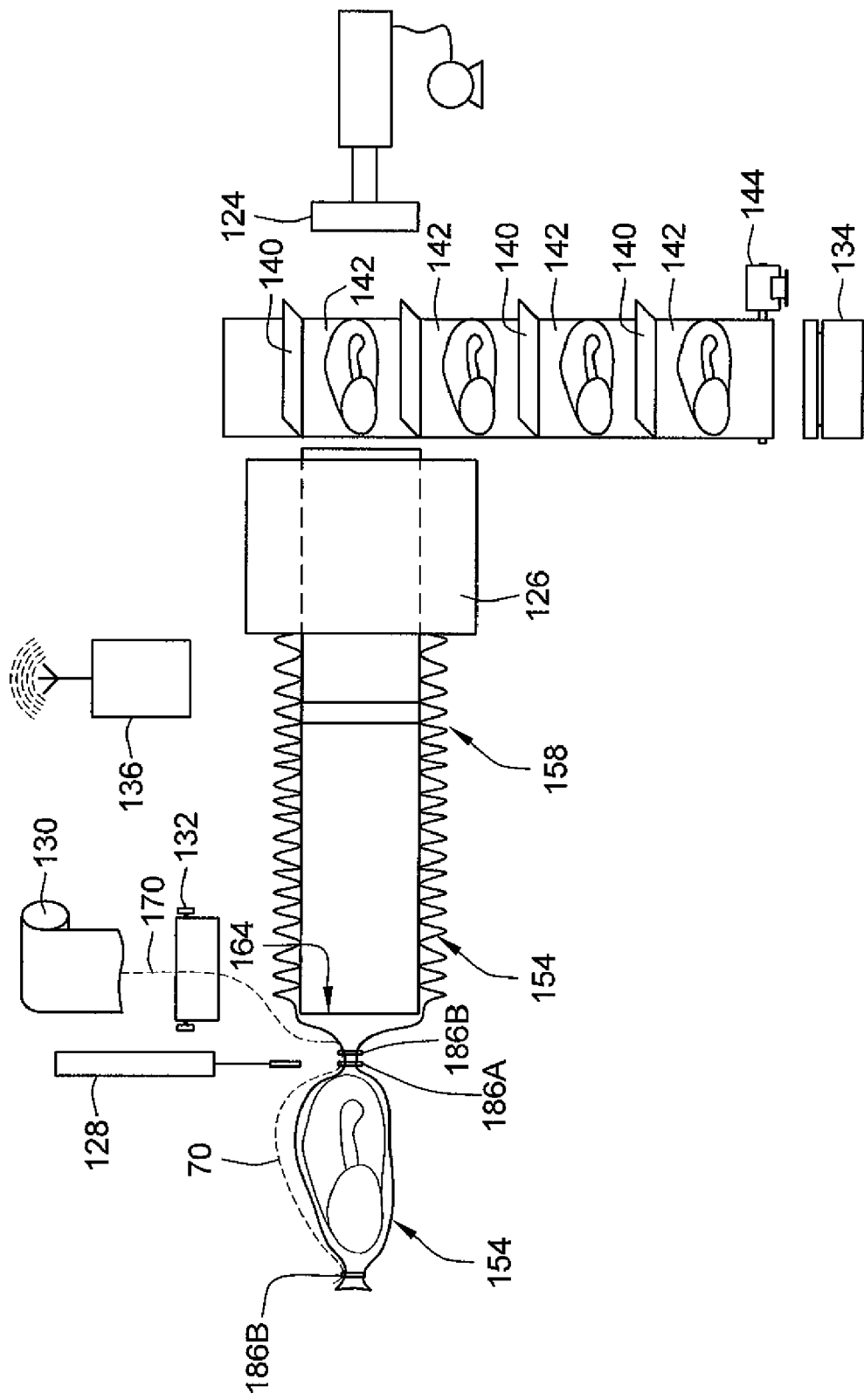
FIG. 5 is a diagrammatic plan view of the apparatus of another embodiment of the present invention.
Figure 6:
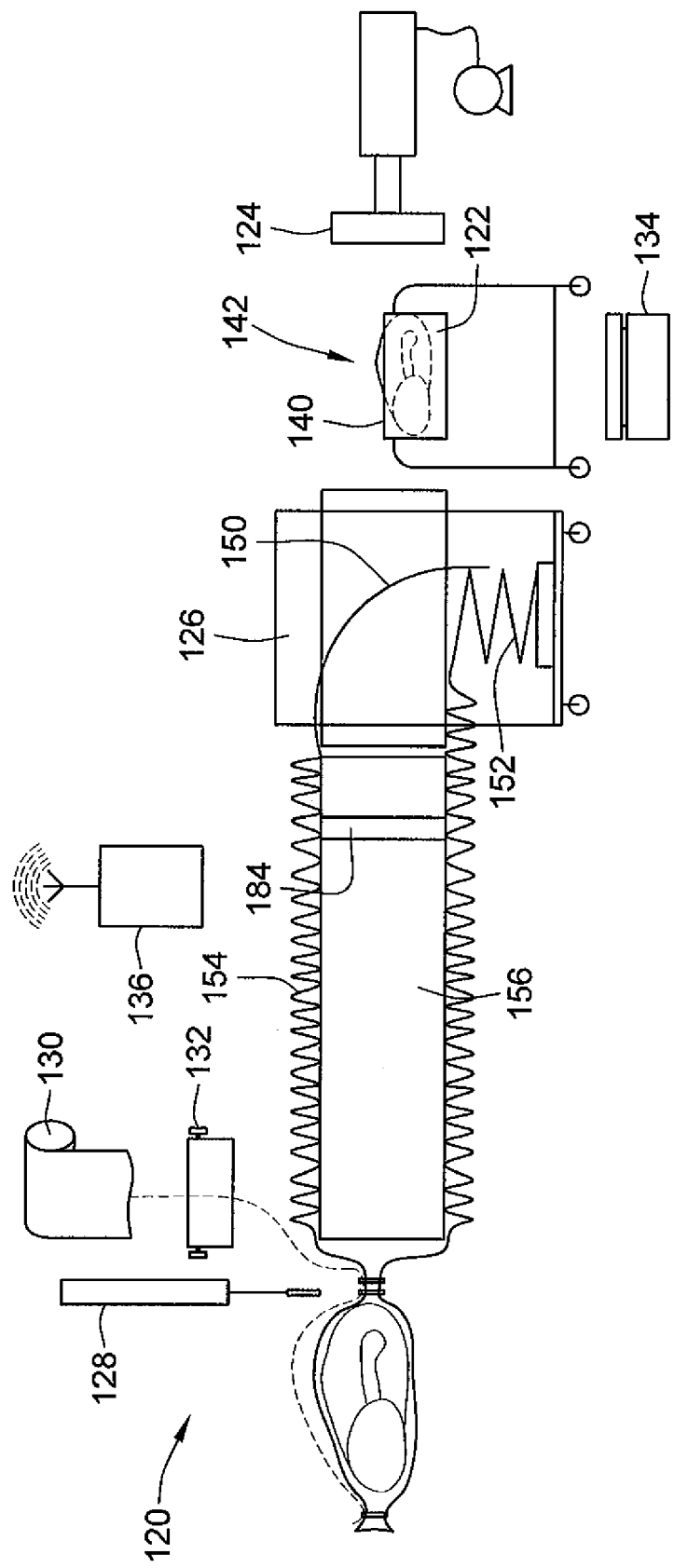
FIG. 6 is a diagrammatic elevation view of the apparatus of FIG. 5.

An apparatus 120 of another embodiment of the present invention is shown in plan view in FIG. 5 and in elevation view in FIG. 6. Apparatus 120 has a delivery conveyor 122, a ram 124, a sealer 126, a clipper 128, a tag reel 130, a printer 132, a scale 134, and a controller 136.

Delivery conveyor 122 is preferably a belt conveyor, with dividers 140 separating a plurality of compartments 142, and a motor 144 driving the belt. As illustrated in FIG. 6, four compartments 142A, 142B, 142C, and 142D are shown on top of delivery conveyor 122. In another embodiment, delivery conveyor 122 is a chute conveyor, a roller conveyor, a roller table, or a trolley conveyor. In yet other embodiments, delivery conveyor 122 is a cart or a table. Delivery conveyor 122 terminates at its downstream end 146 at a location approximately between rain 124 and sealer 126.

In this embodiment, scale 134 is integral with delivery conveyor 122 and located between ram 124 and sealer 126. In another embodiment, scale 134 is separate from delivery conveyor 122 and located adjacent to an upstream end 148 of delivery conveyor 122. Scale 134 is in data communication with controller 136, either wirelessly or through a cable, and relays weight information to controller 136.

Ram 124 is preferably located adjacent downstream end 146 of delivery conveyor 122. Ram 124 is preferably an air-actuated cylinder having a forward and reverse stroke. Ram 124 operates off a plant compressed air system or an application-specific compressed air system. In other embodiments, ram 124 operates electromechanically, mechanically, or manually. For applications in which apparatus 120 is used to enclose poultry such as chickens, ram 124 preferably has a hocking pusher, as described in U.S. Pat. No. 7,178,310 to Veselovsky, Poly-Stretch Bagger System with Hocking Pusher, the disclosure of which is incorporated herein.

Sealer 126 is preferably a Poly-clip System TSA 200 Automated Sealing Machine. Sealer 126 contains a plow 150. A flat sheet of film 152, such as an edible collagen film, which is produced in fan-fold arrangement or on a roll, is mounted on and turned over plow 150 to create a tube. Sealer 126 seals the seam of the tube to form tubular seamed casing 154. Casing 154 proceeds out of sealer 126 and over product horn 156, which is mounted above plow 150.

Product horn 156 is a tube having a first end 160 adjacent downstream end 146 of delivery conveyor 122, on a side of delivery conveyor 122 opposite to ram 124. Product horn 156 in the this embodiment has, in cross section, a flat bottom and a circular sides and top, as shown in FIG. 3. Preferably, product horn 156 has a roller tray 162 inside it on the flat bottom, to ease movement of product through the product horn 26. In other embodiments, product horn 156 has a roller belt or other conveyor inside it for this purpose. In yet other embodiments, product horn 156 is empty.

At a second end 164 of product horn 156 is clipper 128. Clipper 128 is a standard two-punch clipper, such as an FCA3463 Automatic Double Clipper made by Poly-clip System. Clipper 128 is configured to squeeze a neck of a tube, apply a pair of clips 186B, 186A to the neck, and sever the neck between the clips 186B, 186A. In another embodiment, clipper 128 is a manual two-punch clipper.

Tag reel 130 is located adjacent clipper 128 and is preferably mounted to clipper 128. Tag reel 130 holds a plurality of tag handles 70, as described above and illustrated in FIG. 3. The continuous strip of tag handles 70 rolls out of tag reel 130 and feeds through printer 132 and into the jaws of clipper 128.

Printer 132 is preferably an ink-jet printer. Printer 132 is preferably in data communication with controller 136, which receives information from scale 134, either wirelessly or through a dedicated cable. In other embodiments, printer 132 is in data communication directly with scale 134. Printer 132 receives variable information from controller 136, such as weight of a particular dressed bird, price per pound, total price, and packaging date, and prints that data on tag handle 70. Controller 136 can also direct printer 132 to print nonvariable information such as a producer's trademark on tag handles 70, or printer 132 can be programmed to do so directly. In another embodiment, nonvariable information such as trademarks, including logos and trade dress color schemes, are pre-printed on tag handles 70.

In one embodiment, product horn 156 is securely mounted to sealer 126. In another embodiment, product horn 156 is removably mounted to sealer 126. A user can, in this embodiment, keep a spare product horn (not shown) available. Spare product horn can have a different size, or can be the same size and used solely to facilitate changing casings. Furthermore, in this latter embodiment, product horn 156 can be removed from sealer 126, sealer 126 can be removed from the area, and product horn 156 can be relocated between delivery conveyor 122 and clipper 128 for use with seamless tubular casing.

In yet another embodiment, product horn 156 is mounted so that it pivots about a swivel joint 184 downstream of sealer 126, so that downstream end 146 moves from a first position adjacent to clipper 128, to a second position remote from clipper 128. The first position is for operation of apparatus 120 to encase products. In the second position of product horn 156, seamless tubular casing 80 is more easily shirred onto product horn 156. This configuration is described in more detail in U.S. patent application Ser. No. 12/541,430, filed Aug. 14, 2009, the disclosure of which is incorporated herein.

In some embodiments, a netting tube (not shown) is removably mounted over product horn 156. A cylinder of netting is rucked onto netting tube, preferably by the method described in U.S. Pat. No. 7,051,415 to Pinto et al., Net Rucking Apparatus and Method, or by the method described in United States Published Patent Application No. 2008/0248735 A1 by Haschke et al. Net Rucking Apparatus and Method, the disclosures of both of which are incorporated herein by reference.

The edible collagen film in sealer 126 can be dyed white on one half of its width, so the casing 154 is white on one side and clear on the other. In some embodiments, marketing information, such as logos and other trademarks, is pre-printed on the edible collagen film and, therefore, on casing 154. In other embodiments, marketing information is printed on casing 154 by printer 132.

In use, apparatus 120 is placed adjacent a chicken-dressing facility. Chickens are slaughtered, plucked, and dressed and placed in a compartment 142 at the upstream end of delivery conveyor 122. Delivery conveyor 122 eventually delivers a particular whole dressed bird to a position between ram 124 and product horn 156. In the preferred embodiment, the whole dressed bird is weighed on scale 134 and the weight is transmitted to printer 132. In other embodiments, the whole dressed bird is weighed elsewhere, as described above.

Controller 136 then causes ram 124 to actuate. At this point in the process, casing 154, formed by sealer 126 as described above, is closed at its downstream end, at the second end 164 of product horn 156, by a single clip 186B. Single clip 186B also holds a first end 72 of the next tag handle 70 of the strip of tag handles 70, with body 74 still within printer 132. As ram 124 actuates on a forward stroke, it pushes the whole dressed bird through product horn 156 and up against the closed end of casing 154. The bird contacts the closed end of casing 154 and is pushed through product horn 156, taking more casing 154 from product horn 156. As the bird pushes portions of casing 154 off product horn 156, tag handle 70 is also pulled out of printer 132. As tag handle 70 is pulled out, printer 132 prints information, at least variable information and, if desired, non-variable information, on tag handle 70.

When the bird is completely through product horn 156, ram 124 retracts on a reverse stroke. The jaws of clipper 128 then gather casing 154 into a neck, between the bird and product horn 156. Clipper 128 then applies two clips 186A and 186B to the neck in a conventional manner, except that tag handle 70 is clipped to the neck as well. Clipper 128 then severs the neck between the two clips 186A, 186B in a conventional manner. The downstream clip 186A then encases the bird in a portion of casing 154. The upstream clip 186B holds casing 154 closed over product horn 156 and will become the downstream clip 186A of the next bird to be encased.

The bird that was just encased is now encased inside a segment of casing 154 by a clip 186A, 186B at each end of the segment. Tag handle 70 is now attached to the package holding the bird, with first end 72 clipped to one end of the packaging and second end 76 clipped to the opposite end. In the same manner as described for the other embodiment, tag handle 70 can be grasped by a consumer to lift the package without having to touch the encased bird.

In some embodiments, in which netting tube is mounted over product horn 156, the final package encases the bird in both plastic and netting, with the clips 186A, 186B sealing both the plastic and the netting at each end and holding a tag handle 70 in between.

In situations in which the user wishes to change from using seamed casing 154 to seamless casing 80, power is turned off to sealer 126 and residual seamed casing 154 is removed. Product horn 156 is swiveled to its second position and seamless casing 80 is shirred onto product horn 156. Product horn 156 is then swiveled back to its first position and the process continues as described above to encase poultry in seamless casing 80.

If the user wants to change to using seamed casing 154, product horn 156 is swiveled to its second position, residual casing 80 is removed, and product horn 156 is swiveled back to its first position. Flat film 152 is pulled over plow 150 as sealer 126 is restarted, and the process continues as described above to encase poultry in seamed casing 154.

Figure 7:
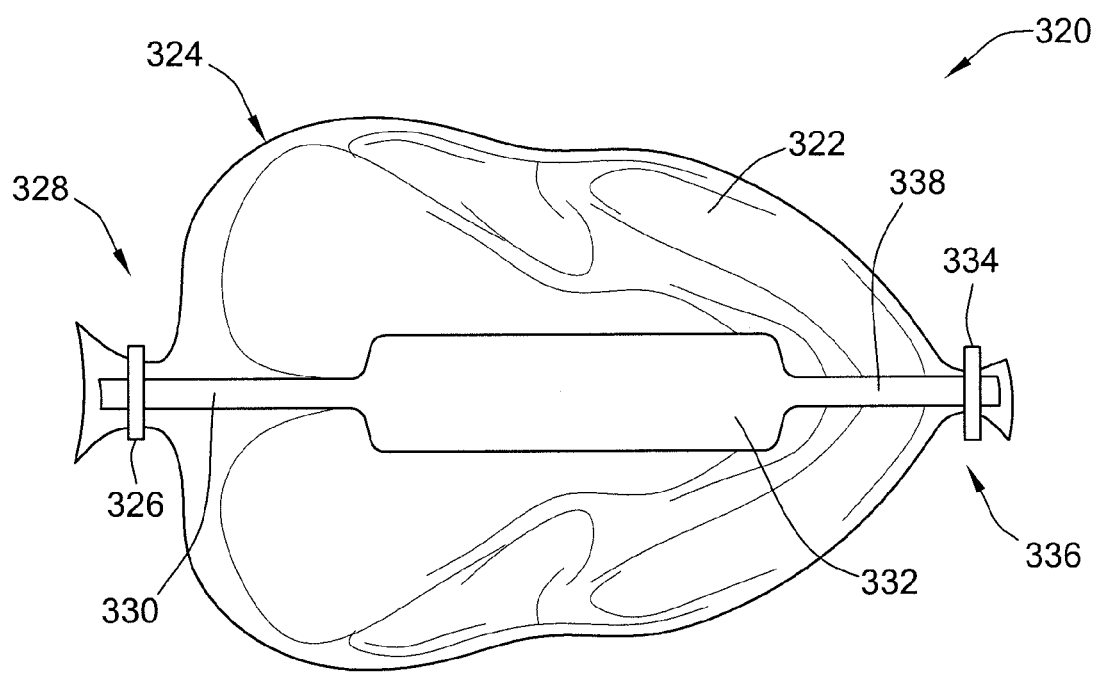
FIG. 7 is a top view of the article manufactured by an apparatus of the present invention.

The article 320 created by the apparatus of the present invention, shown in FIGS. 7 and 8, comprises a product 322, such as a whole dressed bird, encased in a tubular material 324. A first clip 326 closes a first end 328 of the tubular material 324 and attaches a first end 330 of a handle 332. A second clip 334 closes a second end 336 of the tubular material 324 and attaches a second end 338 of handle 332.

In another embodiment of the present invention, tags 70 are not in a continuous strip, but are separated. In this embodiment, tags 70 feed individually into printer 32 or printer 132 and then into the jaws of clipper 28 or clipper 128.

While preferred embodiments of the present invention are shown and described, it is envisioned that those skilled in the art may devise various modifications of the present invention without departing from the scope of the appended claims.

I claim:
1. A method comprising:
providing a product having first and second ends;
using a scale to weigh said product;
moving said product from a first position to a second position via a delivery conveyor;
using a ram located on a first side of the delivery conveyor to push said product off of said delivery conveyor and into a product horn located at a side of the delivery conveyor opposite the ram, the product horn having a first end and a second end, the first end of said product horn being adjacent to the delivery conveyor and the second end of said product horn being remote from the delivery conveyor;

providing a tubular material having first and second ends and a length measured between said ends, said tubular material is open at a first end and is open at said second end;

inserting said product into said tubular material such that said first end of said product is proximate to said open first end of said tubular material and said second end of said product is proximate to said second open end of said tubular material;

feeding a tag handle through a printer which is in data communication with said scale, said printer printing information on said tag handle, said tag handle having first and second ends and a length measured between said ends which is greater than the length of said tubular material;

using a clipper located at the second end of the product horn to place a first clip on said tubular material and said handle to close said first end of said tubular material and attach said first end of said handle to said first end of said tubular material; and using said clipper to place a second clip on said tubular material and said handle to close said second end of said tubular material and attach said first end of said handle to said first end of said tubular material, said handle being of such a length such that a hand can be placed between said first and second ends of said handle and said tubular material when said product is encased in said tubular material.

2. The method of claim 1, further comprising providing a swivel joint in the product horn, and pivoting the second end of the product horn from a first position adjacent the clipper to a second position remote from the clipper.

3. The method of claim 1, wherein the scale is located between the ram and the product horn.

4. The method of claim 1, further comprising using a sealer to form said tubular material about the product horn.

5. An article of manufacture, comprising:
   in a tubular material having a first end and a second end, and a length measured between said first end and said second end;
   a handle having a first end and a second end, and a length measured between said first end and said second end which is greater than the length of said tubular material;
   a product having a first end and a second end, said product being enclosed in said tubular material such that said first end of said product is proximate to said first end of said tubular material and such that said second end of said product is proximate to said second end of said tubular material;
   a first clip closing said first end of said tubular material and attaching said first end of said handle to said first end of said tubular material; and
   a second clip closing said a second end of said tubular material and attaching said second end of said handle to said second end of said tubular material,
   wherein a hand of a user carrying the article can be placed between said first and second ends of said handle and said tubular material when said product is encased in said tubular material.

6. The article of claim 5, wherein the tubular material comprises polyethylene and vinyl acetate.

7. The article of claim 5, wherein said tubular material comprises a plastic material and a memory agent.

\* \* \* \* \*